(12) United States Patent
Song et al.

(10) Patent No.: US 10,401,164 B2
(45) Date of Patent: Sep. 3, 2019

(54) SENSOR NETWORK DESIGN AND INVERSE MODELING FOR REACTOR CONDITION MONITORING

(71) Applicants: Limin Song, West Windsor, NJ (US); Krishnan Kumaran, Raritan, NJ (US); Bhaskar Sengupta, Little Egg Harbor, NJ (US); Jingbo Wang, Sugarland, TX (US)

(72) Inventors: Limin Song, West Windsor, NJ (US); Krishnan Kumaran, Raritan, NJ (US); Bhaskar Sengupta, Little Egg Harbor, NJ (US); Jingbo Wang, Sugarland, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 963 days.

(21) Appl. No.: 14/037,953

(22) Filed: Sep. 26, 2013

(65) Prior Publication Data
US 2014/0107964 A1    Apr. 17, 2014

Related U.S. Application Data

(60) Provisional application No. 61/714,396, filed on Oct. 16, 2012.

(51) Int. Cl.
*G01B 21/20* (2006.01)
*G05B 23/02* (2006.01)

(52) U.S. Cl.
CPC ......... *G01B 21/20* (2013.01); *G05B 23/0254* (2013.01)

(58) Field of Classification Search
None
See application file for complete search history.

(56) References Cited

U.S. PATENT DOCUMENTS 3,906,437 A * 9/1975 Brandwein .......... G01M 15/05
340/870.11
4,349,728 A * 9/1982 Phillips ................. B06B 1/0681
235/400

(Continued)

OTHER PUBLICATIONS

Estimation of local heat transfer coefficient on a cylinder: comparison between an analytical and an optimization method, Elian Coment, Tabar Loulou, and Denis Maillet, Inverse Problems in Science and Engineering vol. 15, Oct. 5, 2005.*

(Continued)

*Primary Examiner* — Gregory J Toatley, Jr.
*Assistant Examiner* — Brandon J Becker
(74) *Attorney, Agent, or Firm* — Glenn T. Barrett

(57) ABSTRACT

Methods and systems for detecting a condition within a component of a process plant, including obtaining a first and second set of parameter measurements from a first and second plurality of sensor locations along a first dimension of an outside surface of a component, processing the first and second set of parameter measurements to develop a continuous surface condition profile of the component using a predetermined model. The predetermined model includes a forward solution to an equation describing the condition and is linearly separable in at least two dimensions corresponding to the first and second dimension. The model includes an inverse solution to the equation to provide a set of coefficients corresponding to a set of basis functions of the forward solution based on the first and second set of parameter measurements.

25 Claims, 10 Drawing Sheets

(56) References Cited

U.S. PATENT DOCUMENTS

| | | | | |
|---|---|---|---|---|
| 4,794,795 | A * | 1/1989 | Djorup | G01P 5/12 |
| | | | | 73/170.12 |
| 5,091,207 | A * | 2/1992 | Tanaka | C23C 16/52 |
| | | | | 118/50 |
| 5,141,709 | A * | 8/1992 | Gaussa, Jr. | G01T 3/00 |
| | | | | 250/390.01 |
| 5,151,882 | A * | 9/1992 | Kingman | E21B 44/00 |
| | | | | 367/41 |
| 5,407,641 | A * | 4/1995 | Katschnig | A61L 2/12 |
| | | | | 219/679 |
| 5,447,550 | A * | 9/1995 | Leal-Cantu | C21B 13/00 |
| | | | | 266/83 |
| 5,734,098 | A | 3/1998 | Kraus et al. | |
| 5,832,411 | A | 11/1998 | Schatzmann et al. | |
| 6,385,558 | B1 | 5/2002 | Schlemm | |
| 7,058,549 | B2 * | 6/2006 | Gysling | G01F 1/7082 |
| | | | | 702/189 |
| 7,470,060 | B1 | 12/2008 | Hoben et al. | |
| 7,673,524 | B2 * | 3/2010 | Bailey | G01F 1/666 |
| | | | | 73/861.17 |
| 2003/0068482 | A1 * | 4/2003 | Koch | D04H 1/4258 |
| | | | | 428/313.3 |
| 2005/0109603 | A1 * | 5/2005 | Graham | C10J 3/20 |
| | | | | 201/25 |
| 2007/0061652 | A1 * | 3/2007 | Kaushal | G05B 19/41875 |
| | | | | 714/733 |
| 2007/0201603 | A1 * | 8/2007 | Sato | G21C 1/084 |
| | | | | 376/298 |
| 2009/0074027 | A1 * | 3/2009 | Langley | G01K 17/003 |
| | | | | 374/29 |
| 2009/0092173 | A1 * | 4/2009 | Glombitza | F16L 55/165 |
| | | | | 374/161 |
| 2009/0149981 | A1 | 6/2009 | Evans et al. | |
| 2010/0005860 | A1 * | 1/2010 | Coudray | G01M 3/002 |
| | | | | 73/40.5 R |
| 2010/0023307 | A1 * | 1/2010 | Lee | G05B 23/0254 |
| | | | | 703/7 |
| 2011/0155816 | A1 * | 6/2011 | Jeong | F25B 31/004 |
| | | | | 236/92 B |

OTHER PUBLICATIONS

Introduction to Nuclear Engineering, John R. Lamarsh and Anthony J. Baratta, p. 277-280, 2001.*

Ozisik, Heat Conduction (1993).*

Yue-Tzu Yang, Pao-Tung Hsu and Cha'o-Kuang Chen; "A three-dimensional inverse heat conduction problem approach for estimating the heat flux and surface temperature of a hollow cylinder"; 1997; J. Phys. D: Appl. Phys. 30.*

The International Search Report and Written Opinion of PCT/US2013/062157 dated Feb. 7, 2014.

Yang, et al., "A three-dimensional inverse heat conduction problem approach for estimating the heat flux and surface temperature of a hollow cylinder," J. Phys. D: Appl. Phys., 1997, vol. 30, pp. 1326-1333.

Coment, et al., "Estimation of local heat transfer coefficient on a cylinder: comparison between an analytical and an optimization method," Inverse Problems in Science and Engineering, 2005, vol. 13, No. 5, pp. 449-467.

Imber, et al., "Predicition of Transient Temperature Distributions with Embedded Thermocouples," AIAA Journal, 1972, vol. 10, No. 6, pp. 784-789.

* cited by examiner

SENSOR NETWORK DESIGN AND INVERSE MODELING FOR REACTOR CONDITION MONITORING

CROSS-REFERENCE TO RELATED APPLICATIONS

This application claims priority to U.S. Provisional Application Ser. No. 61/714,396 filed Oct. 16, 2012, which is herein incorporated by reference in its entirety.

FIELD

The presently disclosed subject matter relates to methods and systems for detecting a condition within a component of a process plant. More particularly, the presently disclosed subject matter relates to detecting a condition within a component of a process plant by obtaining at least two sets of parameter measurements from an outside surface of the component.

DESCRIPTION OF RELATED ART

Components of a process plant, such as those in the petroleum and petrochemical processing field, which includes the exploration, production, refining, manufacture, supply, transport, formulation or blending of petroleum, petrochemicals, or the direct products thereof, are often monitored to maintain reliable operation. However, components of a process plant, such as a process reactor, can involve high temperature, high pressure, and high flow velocity, making it difficult or costly to obtain direct internal measurements to determine internal conditions of the component adequately. For example, installing permanent temperature or pressure probes into a component, such as a process reactor, can be intrusive and can be limited to the insertion of measurement probes at only a few fixed measurement points. Such techniques may only provide partial information of the internal condition of the component due to the limited measurement coverage. Alternatively, non-intrusive methods can require expensive and hazardous radiation sources, such as with measurement of the medium phase or density by radiation methods.

Knowledge of wall temperatures of a component of a process plant, such as a reactor, can assist in obtaining important information of the internal processes without hazardous or intrusive internal measurement. For example, in a Gas-To-Liquid (GTL) reactor, corrosion of the gas injection nozzle can cause disturbances to the speed and direction of injected gas beam, which can result in abnormal heat and mass transfer inside the reactor and thus can cause damage. During such an event, the mal-distribution of heat and mass inside reactor can be reflected in the wall temperature distribution. Additionally, knowledge of the wall temperature can serve as a more realistic boundary condition for reactor simulations or identify deviations from simulation predictions.

Though a condition at the wall of a component of a process plant can provide valuable information, convenient measurement can be frustrated by the large number of sensors required to obtain high spatial frequency estimates of the continuous wall profile. While an increase in the density of sensors employed may yield higher spatial frequency information, such a technique would also be costly to install and maintain.

Accordingly, there is a continued need for improved methods and systems for detecting a condition within a component of a process plant.

SUMMARY OF THE INVENTION

In accordance with one aspect of the disclosed subject matter, a method for detecting a condition within a component of a process plant includes obtaining a first set of parameter measurements from a first plurality of sensor locations along a first dimension of an outside surface of a component and obtaining at least a second set of parameter measurements from a second plurality of sensor locations along a second dimension of the outside surface of the component. The first set of parameter measurements and the second set of parameter measurements are processed, using a computer, to develop a continuous surface condition profile of the component using a predetermined model. The model includes a forward solution to an equation describing a condition within the component and can be linearly separable in at least two dimensions corresponding to the first and second dimensions of the outer surface of the component. The model also includes an inverse solution to the equation to provide a set of coefficients, corresponding to a set of basis function of the forward solution, based on the first and second set of parameter measurements for solving the forward solution. The method includes identifying from the continuous surface condition profile the condition within the component.

In one embodiment, the component includes a cylindrical vessel having a central axis, an inner wall diameter and an outer surface (e.g., outer wall) diameter. The first dimension can be parallel to the central axis and disposed at the outer surface diameter, and the second dimension can be disposed along a circumference at the outer surface diameter of the cylindrical vessel.

A number of different conditions can be determined, such as the temperature within the component can be temperature, wherein the condition within the component can be a condition of the inside wall of the component. The first set of parameter measurements and the second set of parameter measurements thus can be temperature measurements, and the predetermined model can be based on the heat diffusion equations.

In one embodiment, the forward solution can be a linear combination of basis functions multiplied by the set of coefficients. The set of coefficients can be generated based on a predetermined relationship between the first and second set of parameter measurements.

Furthermore, the method can include predetermining how many coefficients to include in the set of coefficients corresponding to the set of basis functions. For example, predetermining how many coefficients to include can include obtaining a first calibration set of parameter measurements from at least one of the first plurality of sensor locations or the second plurality of sensor locations and applying a transform to the first calibration set to identify a set of coefficients corresponding to spatial frequencies along the first dimension with energy above a predetermined threshold. The transform can be, for example, a discrete cosine transform or a fast Fourier transform.

The first set of parameter measurements can be obtained by a plurality of sensors. For example, each sensor in the plurality of sensors can be a wireless sensor, and the plurality of sensors can be configured to form a wireless mesh network to relay the set of parameter measurements. Alternatively, each sensor in the plurality of sensors can be a sensing region along one or more optical fibers. Other sensing devices such as conventional thermocouples could be used to obtain some or all of the measurements.

In one embodiment, the method can further include estimation of error bounds of reconstructing the continuous surface condition profile from the forward model. At least a third set of parameter measurements can be obtained from at least one additional sensor location along the outside surface of the component. The continuous wall condition profile can be compared with the third set of parameter measurements at locations of the continuous wall condition profile corresponding to the at least one additional sensor location to determine an accuracy of the continuous wall condition profile.

The method can also include displaying on a display device, a representation of the continuous surface condition profile. Additionally or alternatively, the method can include providing an alert when at least a portion of the continuous surface condition profile exceeds a predetermined threshold of the condition.

In accordance with another aspect of the disclosed subject matter, a system for detecting a condition within a component of a process plant includes at least one sensor for obtaining a first set of parameter measurements from a first plurality of sensor locations along a first dimension of an outside surface of a component of a process plant and for obtaining at least a second set of parameter measurements from a second plurality of sensor locations along a second dimension of the outside surface of the component. The system includes a processor operatively configured to process the first set of parameter measurements and the second set of parameter measurements to develop a continuous surface condition profile of the component using a predetermined model. The predetermined model includes a forward solution to an equation describing a condition within the component and is linearly separable in at least two dimensions corresponding to the first and second dimensions of the outer surface of the component. The model further includes an inverse solution to the equation to provide a set of coefficients based on the first and second set of parameter measurements for solving the forward solution. The process is configured to output information about the condition within the component based upon the continuous surface condition profile. Additional and alternative features of the method are likewise applicable to the system disclosed herein.

DETAILED DESCRIPTION

Figure 1:
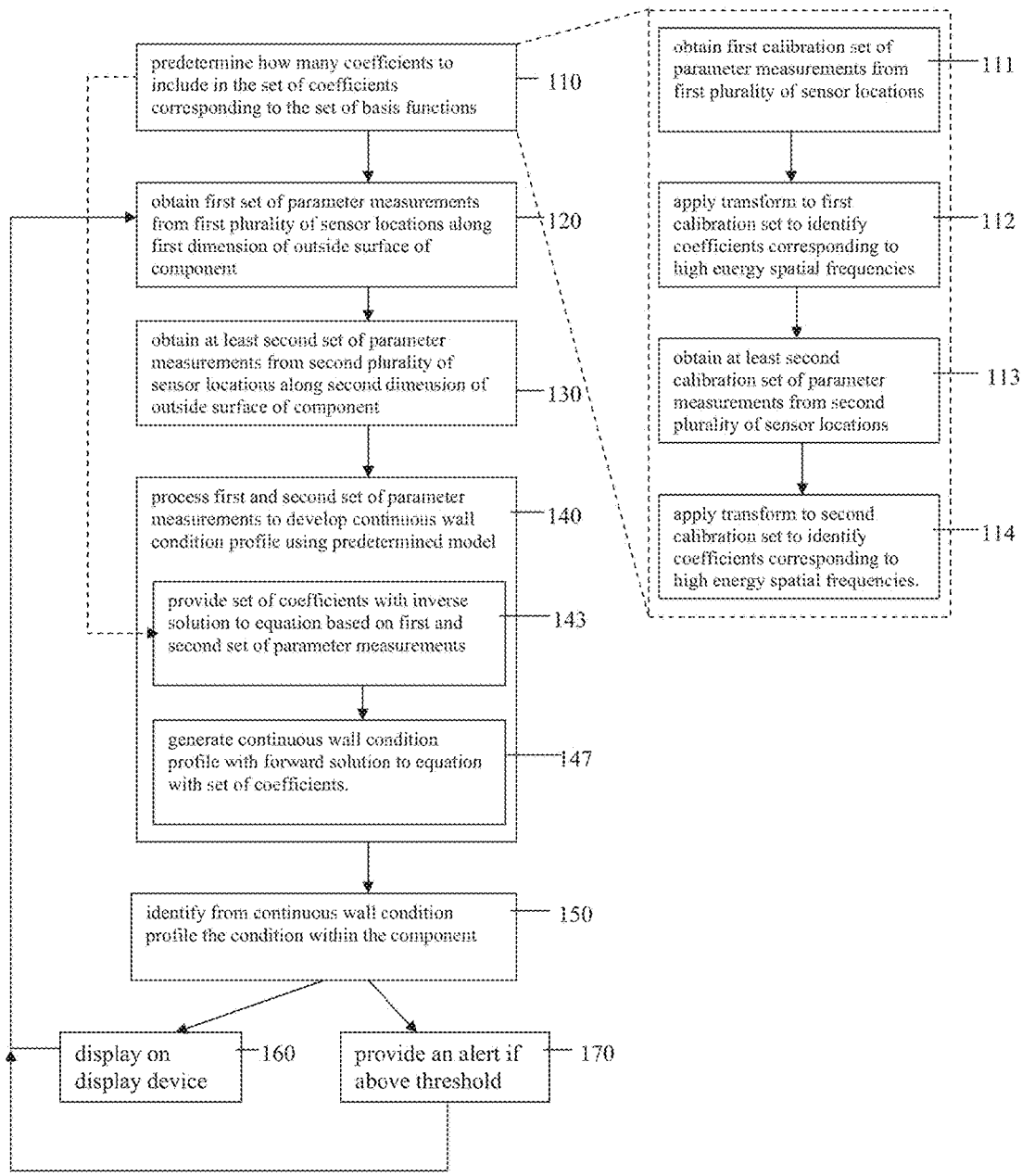
FIG. 1 is a flow diagram of a representative method for detecting a condition within a component of a process plant according to an embodiment of the disclosed subject matter.

The presently disclosed subject matter relates to methods and systems for detecting a condition within a component of a refinery or a petrochemical plant, or a gas and oil processing plant in oil production fields. More particularly, the presently disclosed subject matter relates to detecting a condition within a component of a process plant (e.g., a petroleum refinery, a petrochemical plant, or onshore/offshore oil & gas production plants) by obtaining at least two sets of parameter measurements from an outside surface of the component. The purpose and advantages of the disclosed subject matter will be set forth in, and apparent from, the description that follows. Additional advantages of the disclosed subject matter will be realized and attained by the methods, apparatus, and devices particularly pointed out in the written description and claims hereto, as well as from the appended drawings.

In accordance with one aspect of the disclosed subject matter, a method for detecting a condition within a component of a process plant includes obtaining a first set of parameter measurements from a first plurality of sensor locations along a first dimension of an outside surface of a component and obtaining at least a second set of parameter measurements from a second plurality of sensor locations along a second dimension of the outside surface of the component. The first set of parameter measurements and the second set of parameter measurements are processed, using a computer, to develop a continuous surface condition profile of the component using a predetermined model. The model includes a forward solution to an equation describing a condition within the component and can be linearly separable in at least two dimensions corresponding to the first and second dimensions of the outer surface of the component. The model also includes an inverse solution to the equation to provide a set of coefficients, corresponding to a set of basis function of the forward solution, based on the first and second set of parameter measurements for solving the forward solution. The method includes identifying from the continuous surface condition profile the condition within the component.

In accordance with another aspect of the disclosed subject matter, a system for detecting a condition within a component of a process plant includes at least one sensor for obtaining a first set of parameter measurements from a first plurality of sensor locations along a first dimension of an outside surface of a component of a process plant and for obtaining at least a second set of parameter measurements from a second plurality of sensor locations along a second dimension of the outside surface of the component. The system includes a processor operatively configured to process the first set of parameter measurements and the second set of parameter measurements to develop a continuous surface condition profile of the component using a predetermined model. The predetermined model includes a forward solution to an equation describing a condition within the component and is linearly separable in at least two dimensions corresponding to the first and second dimensions of the outer surface of the component. The model includes an inverse solution to the equation to provide a set of coefficients based on the first and second set of parameter measurements for solving the forward solution. The process is configured to output information about the condition within the component based upon the continuous surface condition profile.

Particular embodiments of the method and system are described below, with reference to FIG. 1 and FIG. 2, for purposes of illustration, and not limitation. For purposes of clarity, the method and the system are described concurrently and in conjunction with each other, wherein reference numbers to the method of FIG. 1 will be made with parenthesis ( ) and reference to the system of FIG. 2 will be made without parenthesis.

Figure 2:
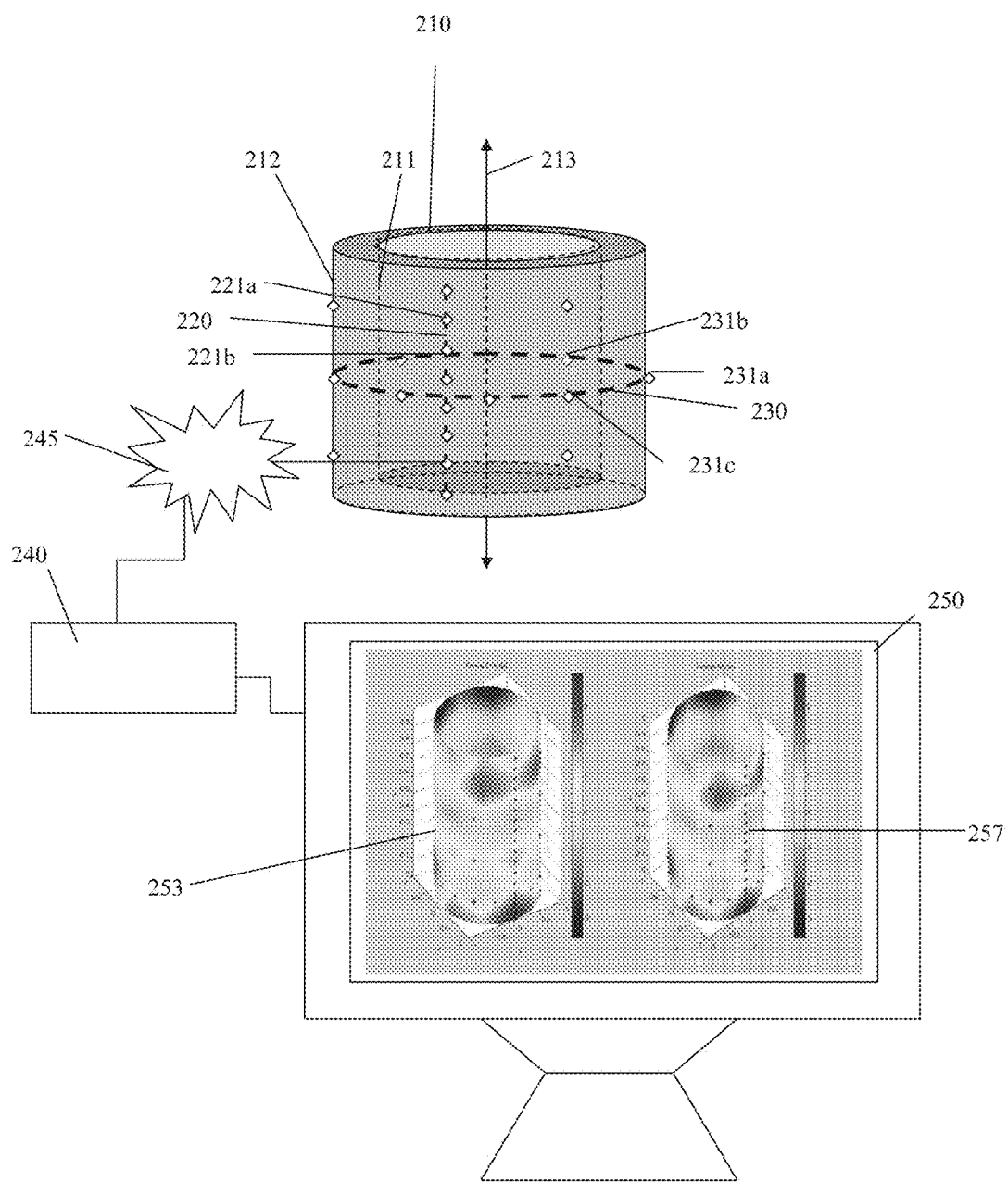
FIG. 2 is a schematic diagram of a representative system for detecting a condition within a component of a process plant according to an embodiment of the disclosed subject matter.

In one embodiment, and with reference to FIG. 1 and FIG. 2, at least one sensor obtains (120) a first set of parameter measurements from a first plurality of sensor locations exemplified by 221a and 221b along a first dimension 220 (shown here as the axial dimension) of an outside surface 212 of a component of a process plant 210. Additionally, at least one sensor obtains (130) at least a second set of parameter measurements from a second plurality of sensor locations 231a-c along a second dimension 230 (shown here as the circumferential dimension) of the outside surface 212 of the component 210.

Figure 4:
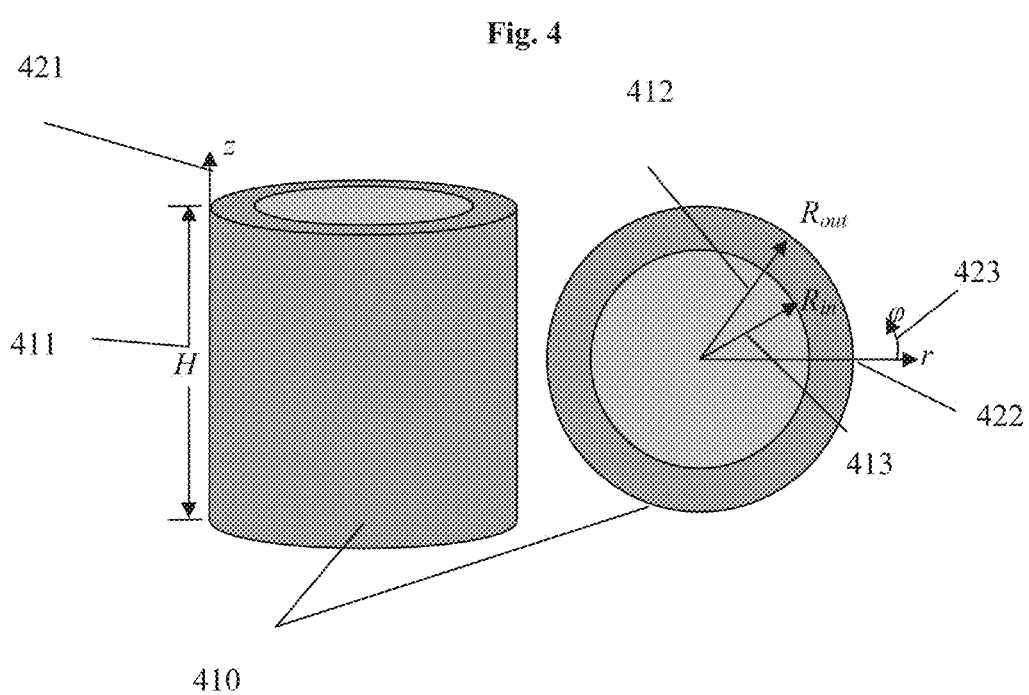
FIG. 4 illustrates the coordinate system and physical parameters for a cylindrical vessel employed according to an embodiment of the disclosed subject matter.

The component of a process plant 210 can be, for example, a process reactor, such as a Gas-To-Liquid (GTL) reactor, although any of a variety of other suitable components are likewise applicable to the disclosed subject matter. For example, the component can be a hydroprocessing reactor (including hydrotreating and/or hydrocracking) used in refineries and chemical plants. The component 210 can include a cylindrical vessel having a central axis 213, an inner wall diameter, and an outer surface diameter. In one embodiment, for example, with reference to FIG. 4, the cylindrical vessel 410 can have an inner wall diameter which would correspond to two times the inner wall radius denoted by $R_{in}$ 413, and an outer surface diameter which would correspond to two times the outer wall radius denoted by $R_{out}$ 412. The cylindrical vessel 410 can also have a height 411, denoted by H. The cylindrical vessel 410 and corresponding model can be expressed in cylindrical coordinates. As used herein, a cylindrical coordinate system includes a radial coordinate 422, denoted by r, an angular coordinate 423, denoted by $\phi$, and an axial coordinate 421, denoted by z.

For purposes of illustration, and not limitation, particular embodiments of the method and system will henceforth be described in detail with respect to a cylindrical vessel. This description is not intended as limiting, as one of ordinary skill in the art will recognize that the system and method disclosed herein can be applied to various component geometries, such as planar, spherical or the like. Additionally, various features of the method and system will henceforth be described in terms of mathematics in cylindrical coordinates for purpose of illustration and not limitation. One of ordinary skill in the art will recognize that analogous expressions can be expressed in other coordinate systems, such as Cartesian (x,y,z) or spherical (r, $\phi_1$, $\phi_2$), or the like.

The at least one sensor can be configured to be moved or repositioned along the outside surface of the component to the various measurement locations (e.g., the first plurality of sensor locations 221a-b and second plurality of sensor locations 231a-c). This movement can be performed manually or autonomously. Alternatively, as embodied herein as shown in FIG. 2, the first and second set of parameter measurements can be obtained by a plurality of sensors. For example, a plurality of sensors can be arranged in fixed positions corresponding to the first plurality of sensor locations 221a-b and second plurality of sensor locations 231a-c.

In one embodiment, the one or more of the sensors can be wireless sensors. In this manner, the plurality of sensors can be configured to form a wireless network or array to relay the first and second set of parameter measurements. Such sensors can include a radio, which can be compliant with, for example, Zigbee® or another suitable wireless standard. As embodied herein, the sensors can be configured to communicate with the processor 240 directly via either hardwire interfaces or via a wireless interface 245, as shown. Additionally alternatively, the sensors can include a series of sensing points or regions along one or more optical fibers. The optical fiber sensors can include, for example, sensors based on Fiber Bragg Grating or scattering-based technologies such as Raman, Rayleigh or Brillouin scattering. Accordingly, the system may include equipment to process optical signals transmitted through the optical fiber to generate temperature measurements. Other suitable sensor array and hardware configurations for signal transmission can be used.

The sensors can be any suitable sensors for the parameter to be measured. For example, and with reference to the measurement of temperature, temperature sensors can include resistance temperature detectors (RTDs), which can use the relationship between electrical resistance and temperature to generate a temperature measurement. Alternatively, the sensors can be thermocouples, which can be used to convert thermal potential difference into electric potential difference. For example, K-type thermocouple sensors can be used.

In one embodiment, again with reference to FIG. 1 and FIG. 2, the first dimension 220 of the first plurality of sensor locations can be parallel to the central axis 213 and disposed at the outer surface diameter 212. The second dimension 230 of the second plurality of sensor locations can be disposed along a circumference at the outer surface diameter 212 of the component 210.

In one embodiment, obtaining (120) the first set of parameter measurements can consist of obtaining the first set of parameter measurements from the first plurality of sensor locations 221a-b along the first dimension 220 only. Additionally or alternatively, obtaining (130) at least a second set of parameter measurements can consist of obtaining the second set of parameter measurements from the second plurality of sensor locations 231a-c along the second dimension 230 only. Furthermore, and in accordance with another embodiment, the only parameter measurements obtained are from the first plurality of sensor locations 221a-b along the first dimension 220 and from the second plurality of sensor locations 231a-c along the second dimension 230. For example, the parameter measurements can be taken along only a line parallel to the central axis 213 and from a circumference, along the outer surface of the cylindrical vessel, circumscribing the cylindrical vessel. The circle circumscribing the cylindrical vessel can lie in a plane orthogonal to the central axis 213 of the vessel.

Figure 3:
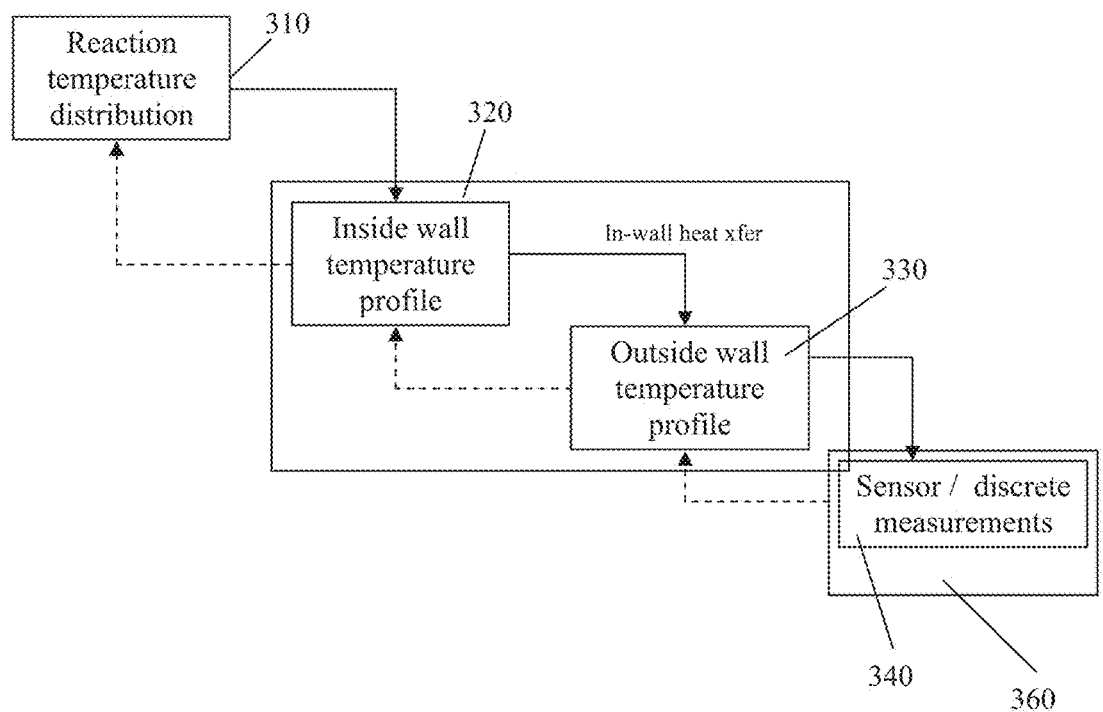
FIG. 3 is a schematic diagram representing information flow associated with a temperature inversion technique in accordance with one embodiment of the disclosed subject matter.

The method and system disclosed herein can be used to determine a number of different conditions, such as temperature, vibration or pressure. For example, and as embodied herein, the condition within the component 210 to be detected can be, for example, temperature. As used herein, the condition "within" the component can refer to a condition of or at the boundary at the inside surface 211 of the component. For example, with reference to FIG. 3, during operation of a component of a process plant, such as a reactor, heat can be generated or accumulated within a chamber of the reactor and cause non-uniform temperature distribution inside the vessel. The reactor wall inside surface temperature 320 is affected by the heat distribution 310 within the reactor. Consequently, the reactor wall outside surface temperature 330 can be affected as well. The reactor wall outside surface temperature 330 thus can be measured at discrete locations 340 in accordance with the disclosed method and system to determine wall inside temperature throughout the vessel wall. Thus, the first and second set of parameter measurements can include temperature measurements to determine a condition on the inside wall of the component. For example, the continuous condition profile can be generated for the outside surface of the component. Additionally or alternatively, a continuous condition profile can be generated for the inside wall of the component by adjusting for wall thickness to estimate the condition profile of the inside wall.

As previously noted, again with reference to FIG. 1 and FIG. 2, for purpose of illustration and not limitation, a processor 240 is operatively configured to process (140) the first set of parameter measurements and the second set of parameter measurements to develop a continuous surface condition profile of the component 210 using a predetermined model. The processor 240 can be adapted to receive a signal from the at least one sensor.

For example, the at least one sensor can be a wireless sensor to relay measurement information to the processor 240 via, for example, a wireless interface 245. Alternatively, the processor 240 can receive measurement information from the at least one sensor after signal processing using suitable hardware. The processor 240 can be housed in a general or special purpose computer, which can also include at least one memory for storing executable code and/or data.

The predetermined model includes a forward solution to an equation describing a condition within the component. The forward solution can be linearly separable in at least two dimensions corresponding to the first and second dimensions of the outer surface of the component. The predetermined model can include an inverse solution to the equation to provide a set of coefficients, corresponding to a set of basis functions of the forward solution, based on the first and second set of parameter measurements for solving the forward solution. That is, the method can include first determining (143) a set of coefficients with the inverse solution and then generating (147) the continuous surface condition profile with the forward solution by multiplying each basis function by a corresponding coefficient in the set and adding the results.

In one embodiment, for purposes of illustration and not limitation, the predetermined model can be based on a heat diffusion equation. For example, the heat diffusion equation can be given by $$\frac{\partial^2 T}{\partial r^2} = \frac{1}{r}\frac{\partial T}{\partial r} + \frac{1}{r^2}\frac{\partial^2 T}{\partial \phi^2} + \frac{\partial^2 T}{\partial z^2} = \frac{1}{\alpha}\frac{\partial T}{\partial t} \qquad (1)$$

where T is temperature, r is a radial coordinate, $\phi$ is an angular coordinate, z is an axial coordinate, $\alpha$ is thermal diffusivity, and t is time. As noted above, reaction inside a chamber of a reactor can cause a non-uniform distribution of temperature, which leads to heat conduction within the vessel wall, which can be governed by equation 1. Linearity of this equation suggests a separation of variables method for seeking the complete solution, and thus equation 1 can be expressed as:

$$T(r,\phi,z,t) = R(r)\Phi(\phi)Z(z)\Gamma(t) \qquad (2)$$

Substituting equation 2 into equation 1 results in $$\frac{1}{R(r)}\left(\frac{d^2 R(r)}{dr^2} + \frac{1}{r}\frac{dR(r)}{dr}\right) + \frac{1}{r^2\Phi(\phi)}\frac{d^2\Phi(\phi)}{d\phi^2} + \frac{1}{Z(z)}\frac{d^2 Z(z)}{dz^2} = \frac{1}{\alpha\Gamma(t)}\frac{d\Gamma(t)}{dt} \qquad (3)$$

Because each of the four terms in equation 3 are functions of r, $\phi$, z and t, respectively, the four terms can all be equal to constants. Thus, for $\Gamma(t)$:

$$-\lambda^2 = \frac{1}{\alpha\Gamma(t)}\frac{d\Gamma(t)}{dt} \therefore \Gamma(t) = e^{-\alpha\lambda^2 t}. \qquad (4)$$

For Z(z):

$$-\eta^2 = \frac{1}{Z(z)}\frac{d^2 Z(z)}{dz^2} \therefore Z(z) = C_{Z_1}\sin\eta z + C_{Z_2}\cos\eta z \qquad (5)$$

For $\Phi(\phi)$:

$$-\nu^2 = \frac{1}{\Phi(\phi)}\frac{d^2\Phi(\phi)}{d\phi^2} \therefore \Phi(\phi) = C_{\Phi_1}\sin\nu\phi + C_{\Phi_2}\cos\nu\phi \qquad (6)$$

For R(r)

$$\frac{1}{R(r)}\left(\frac{d^2 R(r)}{dr^2} + \frac{1}{r}\frac{dR(r)}{dr}\right) - \frac{\nu^2}{r^2} = -\beta^2 \therefore R(r) = C_{\beta_1}J_\nu(\beta r) + C_{\beta_2}J_{-\nu}(\beta r), \qquad (7)$$

where $\beta^2 = \lambda^2 - \eta^2$, $\lambda$, $\eta$, $\nu$, $\beta$ are eigenvalues determined by boundary conditions, sine and cosine functions and the Bessel functions $J_\nu(\beta r)$ and $J_{-\nu}(\beta r)$ are the basis functions, and C's are the constant coefficients of associated basis functions.

Based on equations 4-7, the general solution to equation 1 can be expressed as a linear combination of basis functions:

$$T(r, \phi, z, t) = \tag{8}$$

$$\sum_l \sum_n \sum_n (C_{n1}\sin(v_n\phi) + C_{n2}\cos(v_n\phi)) \cdot (C_{m1} \cdot \sin\eta_m z + C_{m2}\cos\eta_m z) \cdot$$

$$(C_{l1}J_{v_n}(\beta_l r) + C_{l2}Y_{v_n}(\beta_l r)) \cdot e^{-\alpha(\beta_l^2 + \eta_m^2)t}$$

For purpose of simplification, it is assumed there is no heat loss at the curved outer surface of the cylinder, as is the case with insulated reactors. Based upon these assumptions, the following boundary conditions can be defined:

$$\left.\frac{\partial T}{\partial z}\right|_{z=0} = \left.\frac{\partial T}{\partial \phi}\right|_{z=H} = 0, \tag{9}$$

$$\left.\frac{\partial T}{\partial r}\right|_{r=R_{out}} = 0, \tag{10}$$

$$\left.\frac{\partial T}{\partial \phi}\right|_{\phi=0} = 0, \left.\frac{\partial T}{\partial \phi}\right|_{\phi=\pi} = 0. \tag{11}$$

With the boundary conditions described in equations 9-11, the basis functions along the axial and angular directions can be reduced to cosines only, given by:

$$Z(z) = \cos\eta_m z, \quad \eta_m = \frac{m\pi}{H}, \quad m = 0, 1, \ldots \text{ and} \tag{12}$$

$$\Phi(\phi) = \cos v_n \phi, \quad v_n = n = 0, 1, \ldots . \tag{13}$$

The basis function along the radial direction can be given by $$R(r) = J_{v_n}(\beta_l r), \tag{14}$$

where $\beta_l R_{out}$ are stationary points of $J_{v_n}(x)$.

Thus, the forward solution to the equation can be expressed as a linear combination of basis functions multiplied by a set of coefficients. For example, equation 1 can be expressed as $$T(r, \phi, z, t) = \sum_l \sum_m \sum_n C_{l,m,n} J_n(\beta_l r)\cos(n\phi)\cos\left(\frac{m\pi}{H}z\right)e^{-\alpha(\beta_l^2 + (\frac{m\pi}{H})^2)t} \tag{15}$$

$$= \overline{F}(r, \phi, z, t) \cdot \overline{C}$$

where $C_{l,m,n}$ is the set of coefficients, $\eta$ and $\beta$ are eigenvalues determined by boundary conditions, $J_n(\beta_l r)$ are a set of basis functions, $\overline{C}$ is a vector containing all constant coefficients with dimension being L·M·N, and $\overline{F}$ is a vector of the same dimension as $\overline{C}$ containing all admissible combinations of the basis functions.

The unknown coefficients of the forward solution can be uniquely determined if the boundary condition of the inner wall is known. Because measuring the internal wall condition directly is impractical, as discussed above, the first set of parameter measurements from the first plurality of sensor locations 221a-b along the first dimension 220 of the outside surface 212 of the component 210 and the second set of parameter measurements from a second plurality of sensor locations 231a-c along a second dimension 230 of the outside surface 212 of the component 210 can be used to estimate the coefficients.

For example, in one embodiment herein the set of coefficients can be generated based on a predetermined relationship between the first and second set of parameter measurements. For example, a vector given by $\overline{T} = \{T_{ijkp}(r_j, \phi_k, z_p, t_i)\}$ can represent all of the temperature measurements (e.g., both the first set of parameter measurements and the second set of parameter measurements, in addition to any other measurements not included in those sets) on the outer surface with $T_{ijkp}(r_j, \phi_k, z_p, t_i)$ being the ith measurement. From equation 15, the following linear relationship between the unknown coefficients and the measurement vector can be demonstrated:

$$\overline{T} = \overline{F} \cdot \overline{C} + \overline{\omega}, \tag{16}$$

where $\overline{\omega}$ is the measurement noise. The optimal estimation of coefficient vector C can be estimated using a maximum likelihood measure (e.g., the most likely coefficient vector can be chosen using a Gibbs probability distribution on reconstruction error), and can therefore be given by, $$\hat{\overline{C}} = (\overline{F}^T \overline{F})^{-1} \overline{F}^T \overline{T}, \tag{17}$$

Due to the rank deficiency of $\overline{F}^T\overline{F}$ (often referred to as the ill-posedness of an inverse problem), regularization can be introduced, for example as a zero-th order Tikhonov regularization, given by $$\hat{\overline{C}} + (\overline{F}^T\overline{F} + \delta I)^{-1}\overline{F}^T\overline{T}, \tag{18}$$

In some cases, the dimension of the unknown coefficient vector can be larger than the number of measurements. In these cases, equation 16 does not have a unique solution. While application of a regularization technique can render a unique solution by curing the matrix rank deficiency, there is no guarantee that the solution is the correct one. Therefore, in one embodiment, the number of coefficients can be reduced a priori.

In this embodiment, wherein the number of coefficients can be reduced a priori, the method can further include predetermining (110) how many coefficients to include in the set of coefficients corresponding to the set of basis functions. The number of coefficients to include in the set of coefficients can be predetermined for one or both dimensions, as desired. The processor 240 can be configured to make such a determination as follows. A first calibration set of parameter measurements from at least one of the first plurality of sensor locations or the second plurality of second locations can be obtained. A transform can then be applied to the first calibration set to identify a set of coefficients corresponding to spatial frequencies along the first or second dimension with energy above a predetermined threshold. These identified coefficients can be included in the set of coefficients corresponding to the set of basis functions. The type of transform applied can be, for example, a discrete cosine transform (DCT) or a fast Fourier transform (FFT).

Based upon the above, and in accordance with another aspect of the disclosed subject matter, a method of predetermining how many coefficients to include in the set of coefficients corresponding to the set of basis functions is also provided. For purposes of illustration and not limitation, reference will now be described in detail to the exemplary embodiment depicted in FIG. 1 and FIG. 4. First, a first calibration set of parameter measurements from the first plurality of sensor locations along the first dimension of the outside surface of the component is obtained (111). The first calibration set can include N measurements along the first dimension (e.g., the z-axis), given by $\overline{T} = \{T_{ijkp}(r_j, \phi_k, z_p, t_i)\}$. Table 1 illustrates an example set of measurements along the first dimension.

TABLE 1

| Time | Sensor # | Location r | Φ (deg) | Z (z/H) | Temp (deg C.) |
|---|---|---|---|---|---|
| 00:00:00 | 1 | 10 | 0 | 0.05 | 38 |
| | 2 | 10 | 0 | 0.10 | 39 |
| | ... | | | | |
| | 9 | 10 | 0 | 0.45 | 42 |
| | 10 | 10 | 0 | 0.5 | 41 |
| | ... | | | | |
| 00:10:00 | 1 | ... | | | |

This set of temperature measurements can be graphically represented by a curve 510, demonstrating the temperature distribution along the z-axis.

A discrete cosine transform can then be applied (112) to the first calibration set to identify a set of coefficients corresponding to spatial frequencies along the first dimension with energy above a predetermined threshold. The discrete cosign can be given by $$X_m = \sum_{i=0}^{N-1} x_i \cos\left[\frac{\pi}{N}\left(i + \frac{1}{2}\right)m\right] \quad (19)$$

Figure 5:
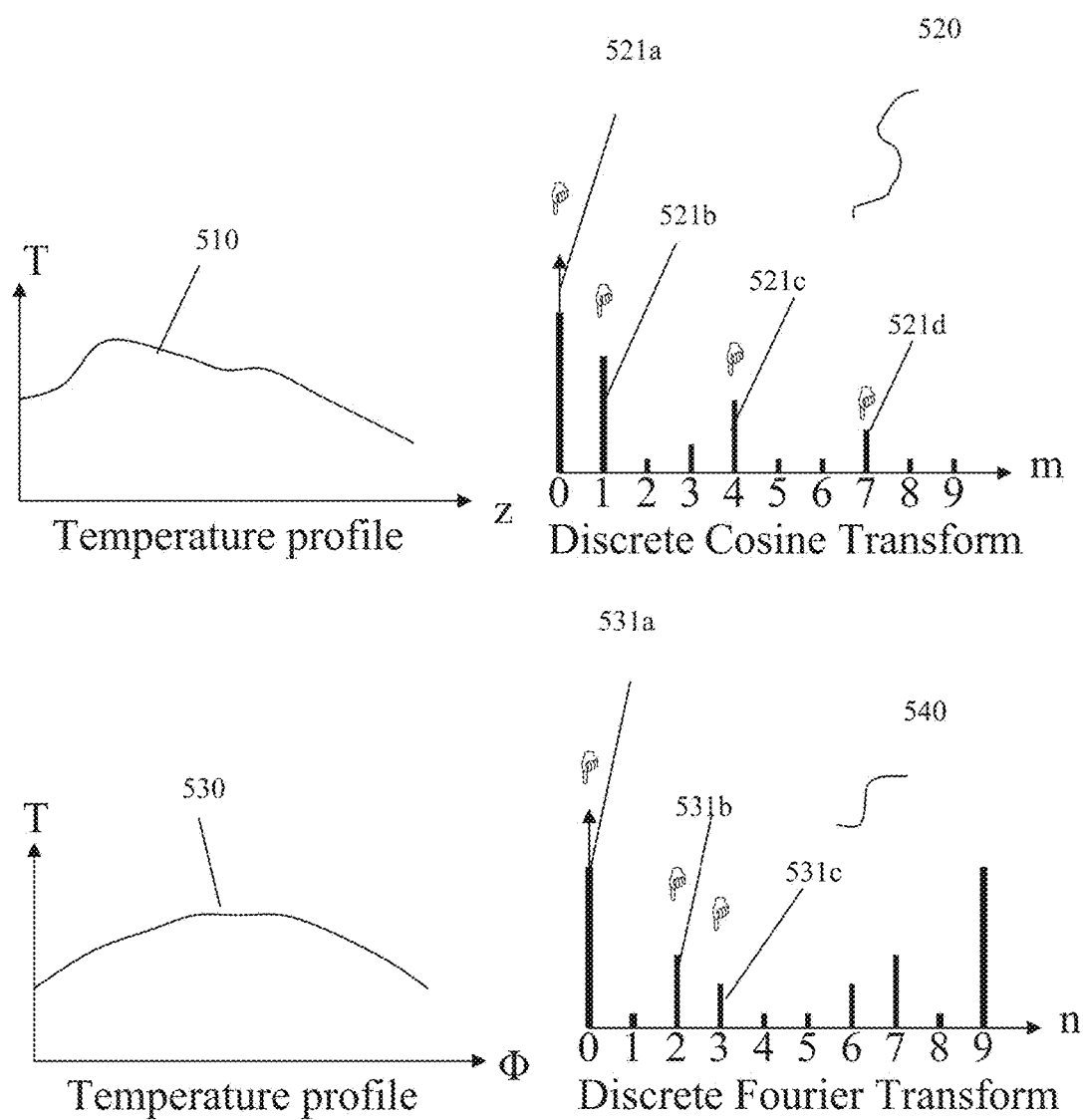
FIG. 5 depicts exemplary temperature distributions in a single dimension of a component of a process plant and corresponding transform results.

The results of the discrete cosine transform 520 are depicted in FIG. 5. Coefficients corresponding to the spatial frequencies with energy above a predetermined threshold, 521*a-d*, can then be identified. Alternatively, coefficients meeting the criteria of a suitable heuristic, for example those corresponding to the spatial frequencies with the highest energy, can be selected.

At least a second calibration set of parameter measurements from the second plurality of sensor locations along the second dimension of the outside surface of the component can be obtained (113). The second calibration set can be include N measurements along the second dimension (e.g., the -axis), given by $\overline{T} = \{T_{ijkp}(r_j, \phi_k, z_p, t_i)\}$. Table 2 illustrates an example set of measurements along the second dimension.

TABLE 2

| Time | Sensor # | Location r | Φ (deg) | Z (z/H) | Temp (deg C.) |
|---|---|---|---|---|---|
| 00:00:00 | 11 | 10 | 18 | 0.5 | 32.1 |
| | 12 | 10 | 54 | 0.5 | 33.5 |
| | 13 | 10 | 90 | 0.5 | 35.2 |
| | ... | | | | |
| | 19 | 10 | -54 | 0.5 | 32.9 |
| | 20 | 10 | -18 | 0.5 | 31.8 |

This set of temperature measurements can be graphically represented by a curve 530, demonstrating the temperature distribution along the -axis.

A fast Fourier transform can then be applied (114) to the second calibration set to identify a set of coefficients corresponding to spatial frequencies along the second dimension with energy above the predetermined threshold. The fast Fourier transform can be given by $$Y_n = \sum_{i=0}^{N-1} y_i \exp\left(-\frac{2\pi n i}{N}\right) \quad (20)$$

Coefficients 540 corresponding to the spatial frequencies with energy above a predetermined threshold, 531*a-c*, can then be identified. Alternatively, coefficients meeting the criteria of a suitable heuristic, for example those corresponding to the spatial frequencies with the highest energies, can be selected.

The set of coefficients along the radial direction can also be predetermined a priori. For example, such coefficients can be selected based upon knowledge or an assumption about the radial temperature distribution. For example, where the difference between the inner wall diameter and outer surface diameter is small (i.e., the wall of the vessel is thin), there is unlikely to be high spatial frequency components in the radial direction with high energy. Likewise, where the material of the vessel is highly conductive, it is unlikely that high spatial frequency components will have high energy. Thus, in one embodiment, for example, only coefficients corresponding to the fundamental and first order spatial frequencies are selected in the radial direction.

In one embodiment, wherein the highest order of the coefficients has been predetermined a priori, the first and second set of sensor locations can also be predetermined. For example, the first set of sensor locations along a first dimension of the component can be spaced at uniform intervals corresponding to a multiple of wavelength of the highest spatial frequency along the first dimension corresponding to a selected coefficient. That is, the highest order coefficient selected can provide the basis for spacing the set of sensor locations. In like manner, the second set of sensor locations can also be spaced at uniform intervals corresponding to the wavelength of the highest spatial frequency along the second dimension corresponding to a selected coefficient. Determining the spacing of the first and second set of sensor locations along the first and second dimensions, respectively, based on the predetermined coefficients can reduce the number of sensors required to obtain a continuous surface profile with high spatial frequency.

In one embodiment, particularly where the set of coefficients has been predetermined, the continuous surface condition profile can be generated (147) with the forward solution to the equation as follows. The C vector can be constructed as:

$$l \in \{0,1,2\}, m \in \{0,1,4,7\}, n \in \{0,2,3\}$$
$$\overline{C} = (C_{l,m,n}) = [C_{000}, C_{002}, \ldots, C_{010}, \ldots, C_{273}]^T \quad (21)$$

The F matrix can then be constructed as:

$$\overline{T} = [T(r^{(0)}, \phi^{(0)}, z^{(0)}, t), T(r^{(1)}, \phi^{(1)}, z^{(1)}, t), \ldots]^T, \quad (22)$$

$$\overline{C} = [C_{000}, C_{002}, \ldots, C_{010}, \ldots, C_{273}]^T$$

$$f(l, m, n, r, \phi, z, t) = J_n(\beta_l r)\cos(n\phi)\cos\left(\frac{m\pi}{H}z\right)e^{-\alpha(\beta_l^2 + (\frac{m\pi}{H})^2)t}, \quad (23)$$

$$\begin{bmatrix} T(r^{(0)}, \phi^{(0)}, z^{(0)}, t) \\ T(r^{(1)}, \phi^{(1)}, z^{(1)}, t) \\ \ldots \end{bmatrix} = \overline{FC} =, \quad (24)$$

$$\begin{bmatrix} f(0, 0, 0, r^{(0)}, \phi^{(0)}, z^{(0)}, t) & f(0, 0, 2, r^{(0)}, \phi^{(0)}, z^{(0)}, t) & \ldots \\ f(0, 0, 0, r^{(1)}, \phi^{(1)}, z^{(1)}, t) & f(0, 0, 2, r^{(1)}, \phi^{(1)}, z^{(1)}, t) & \ldots \\ \ldots & \ldots & \ldots \end{bmatrix} \begin{bmatrix} C_{000} \\ C_{002} \\ \ldots \end{bmatrix}. \quad (25)$$

A regularized estimator of the vector C can then be given as $\overline{\overline{C}} (\overline{F}^T\overline{F} + \delta I)^{-1}\overline{F}^T\overline{T}$.

A continuous surface profile can be generated using the method and system above, a condition within the component can be identified. For example, and as previously noted, during operation of a component of a process plant, such as a reactor, heat can be generated or accumulated within the reactors and cause non-uniform temperature distribution inside the reactor. Due to heat transfer, the inner wall temperature 320 can be affected by the heat distribution 310 within the reactor. Consequently, the outer reactor surface temperature 330 can be affected as well. Thus, if at least a portion of the continuous surface condition profile meets a certain threshold, a condition within the reactor can be identified (150).

Further, in accordance with one embodiment, at least a third set of parameter measurements can be obtained from at least one additional sensor location along the outside surface of the component. The measurements from the additional sensors can be neglected in connection with the determination of the coefficients of the basis functions. The continuous wall condition profile can be compared with the third set of parameter measurements at locations of the continuous wall condition profile corresponding to the at least one additional sensor location to determine an accuracy of the continuous wall condition profile. For example, the discrepancy between actual measurement at the additional sensor locations and the values predicted from the forward model can provide a measure of the errors of model estimation. For example, given a number, P, of additional sensor locations, the error at time i for the ith sensor location can be given by the actual recorded measurement at the ith sensor location minus the predicted measurement at the ith sensor location. For P additional sensor locations, statistics can be calculated to provide error bounds of the predicted continuous surface condition profile.

Further in accordance with the disclosed subject matter, a display device 250 or the like can be provided to display information directly from the at least one sensor and/or subsequently processed information. For example, the display can display information about the condition of the component, including an alert and/or a continuous condition profile as described further below. The display device can be, for example, a computer monitor, personal digital assistance or other suitable graphic display. The display device can be operatively connected to the processor 240 such that the processor can display on the display device a static image at selected intervals on demand, or a continuous surface condition profile, among other things. Furthermore, the processor and display can be configured to provide predictive models of future conditions based upon available data.

In accordance with another aspect of the disclosed subject matter, the method can further include providing (170) an alert and or a display of the surface condition profile (160). For example an alarm can be provided when at least a portion of the continuous surface condition profile satisfies certain criteria such as exceeding a predetermined threshold of the condition. For example, the processor 240 can be configured to further process the continuous surface condition profile or multiple profiles 253 and 257 and determine whether a certain portion of the surface condition profile exceeds, or using a predictive model, will likely exceed, a predetermined temperature, and if so, transmit an alarm. The alarm can be audible, visual, graphical or the like.

In accordance with yet another embodiment, the processor can provide a control signal to alter operation of the component in response to the determined condition. For example, operation of the component or system can be reduced if certain conditions are exceeded. Additionally or alternatively, the reaction temperature in hydroprocessing reactors can be controlled. For example, an upper threshold temperature can be specified by a limit of the reactor wall metal. When the wall temperature increases, part of the hydrogen recycle stream between catalytic beds therein can be introduced into the vessel. This can be referred to as "quenching" or "cold shot cooling."

COMPARATIVE EXAMPLE

Figure 6A:
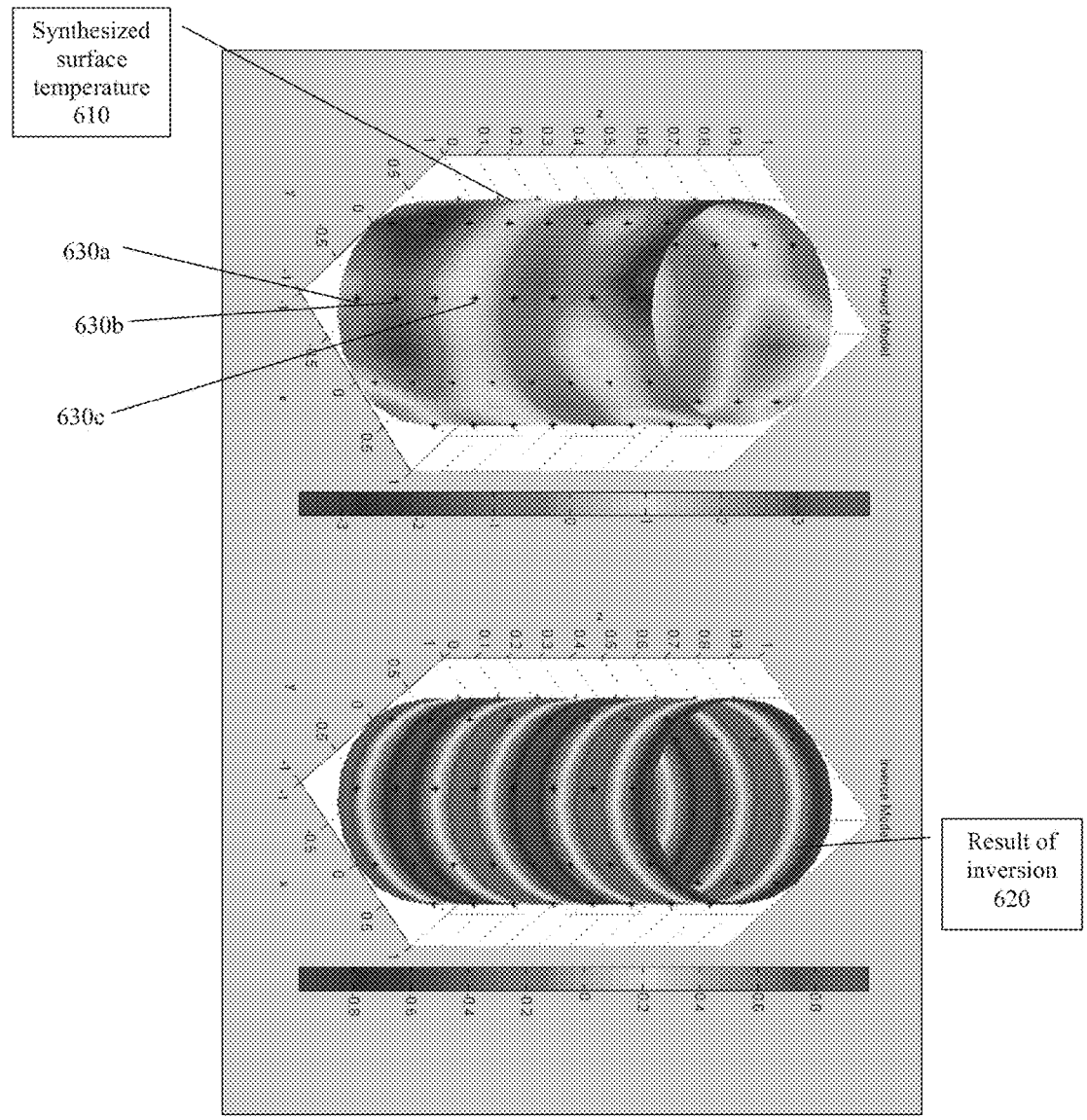
FIG. 6a depicts a model continuous temperature profile and predicted continuous temperature profile using an array of sensors arranged in a standard grid type pattern. (COLOR)
Figure 6B:
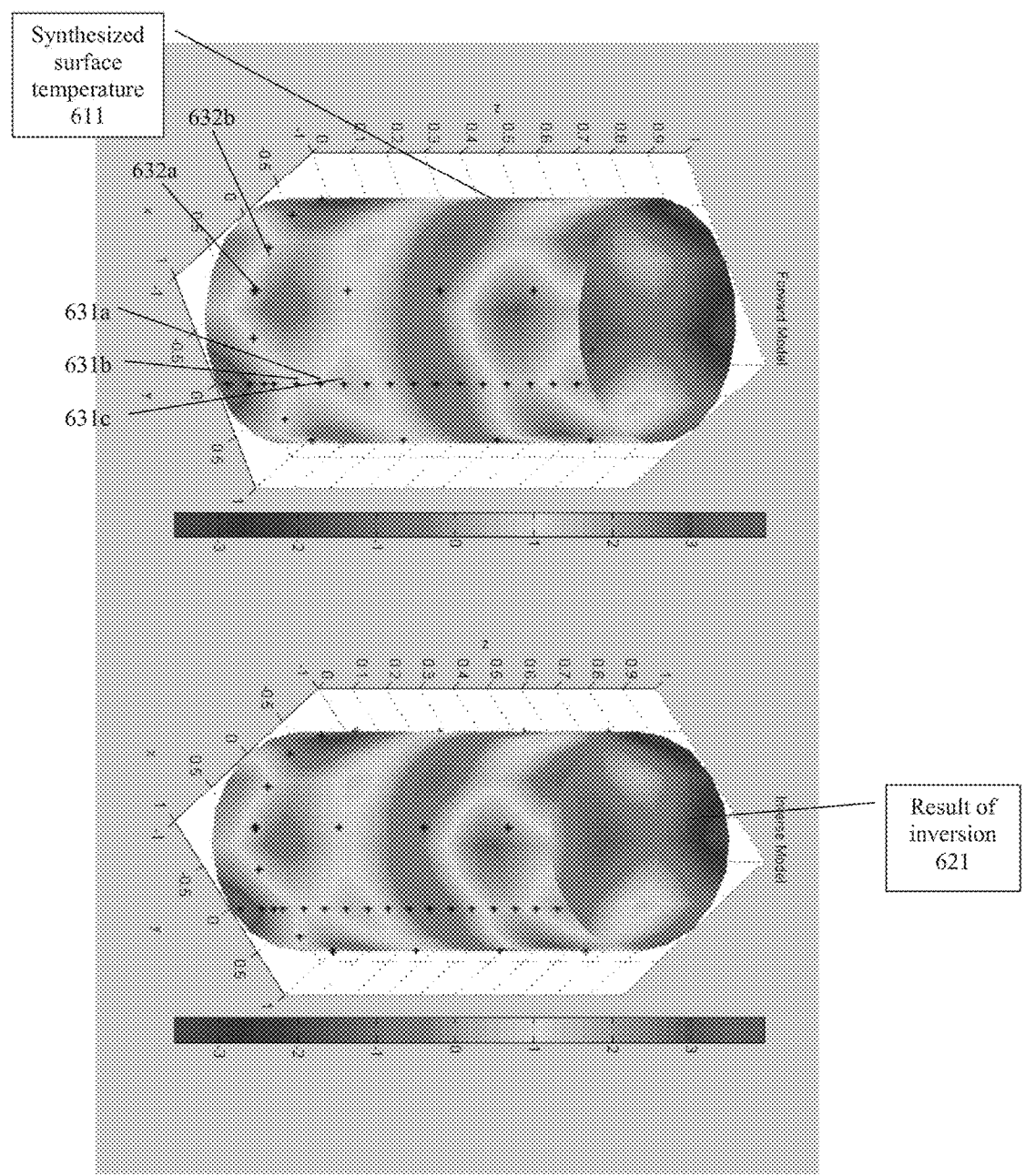
FIG. 6b depicts a model continuous temperature profile and predicted continuous temperature profile using an array of sensors arranged in a pattern according to an embodiment of the disclosed subject matter. (COLOR)

As previously noted, and in accordance with another aspect of the disclosed subject matter, the method and system described above can provide a continuous surface profile for the component with high spatial frequency. As demonstrated through a comparative test, performing the method using a first plurality of sensor locations to obtain a first set of parameter measurements along a first dimension and a second plurality of sensor locations to obtain a second set of parameter measurements along a second dimension in accordance with the disclosed subject matter above results in significant improvement in efficiency accuracy. For purposes of illustration, FIG. 6a is provided for comparison to the exemplary surface condition profile 621 generated in accordance with the disclosed subject matter based upon a synthesized surface temperature 611, as depicted in FIG. 6b. Particularly, FIG. 6a depicts a synthesized surface temperature 610 based upon sensors as exemplified by 630a-c arranged in a standard grid pattern. Measurements from the sensors 630a-c were used to generate a continuous surface condition profile 620 by solving an inverse problem to the heat equation as described above. As is evident from FIG. 6a, the sensors arranged in a standard grid pattern were unable to capture high spatial frequency components of the synthesized surface temperature 610.

By contrast, the continuous surface condition profile 621 generated by the method and system disclosed herein captures high spatial frequency information even while using a fewer number of sensor locations than depicted in the comparative FIG. 6a example. FIG. 6b depicts a synthesized surface temperature 611 with sensors exemplified by 631a-c arranged along a first dimension and sensors exemplified by 632a-b arranged along a second dimension. Measurements from the sensors 631a-c and 632a-b were used to generate a continuous surface condition profile 621 in accordance with the disclosed subject matter. As is evident from the generated surface condition profile 621 in FIG. 6b, the system and method used in accordance with the disclosed subject matter was able to capture high spatial frequency components of the synthesized surface temperature 611 more accurately and efficiently than conventional techniques and sensor grid patterns.

Figure 7A:
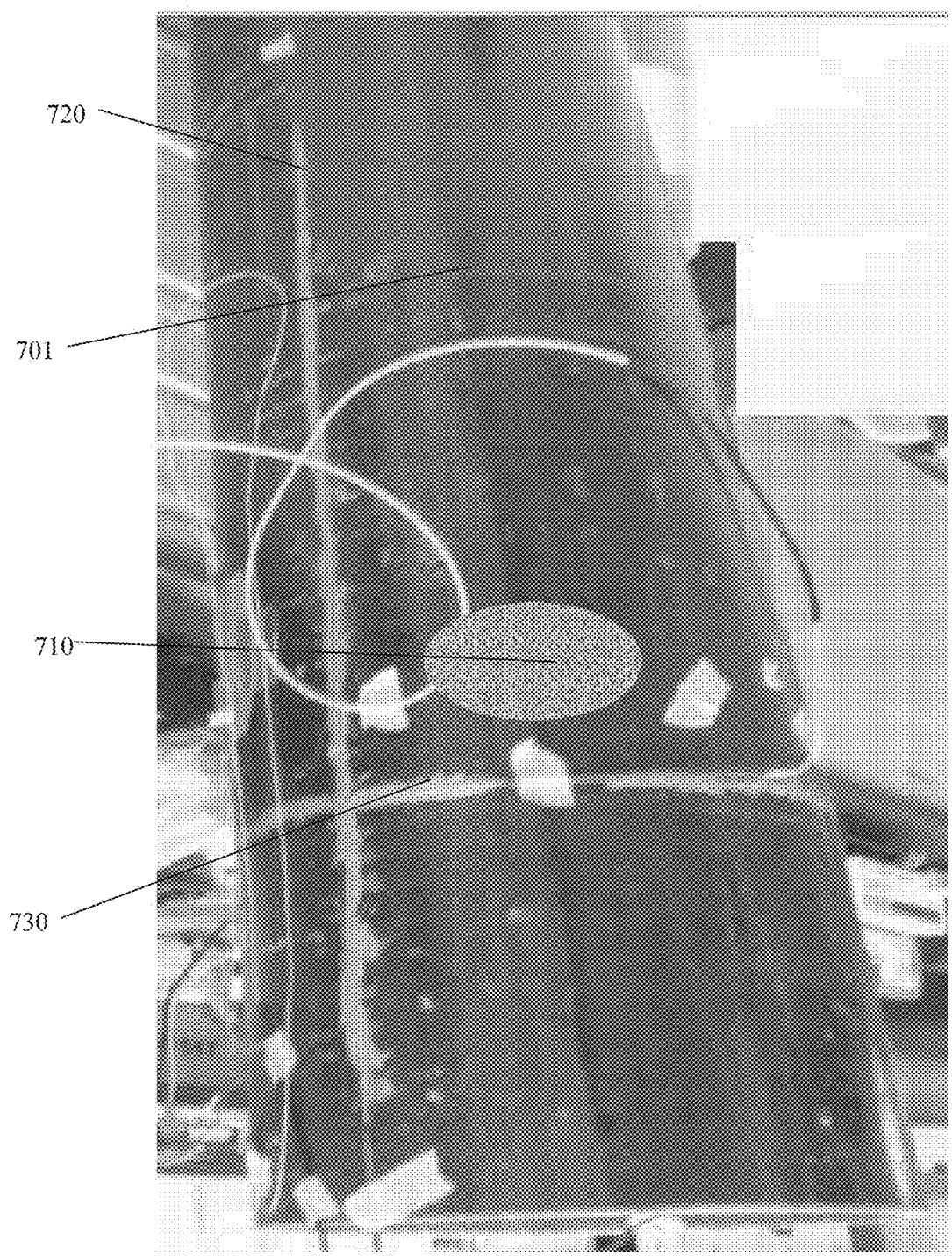
FIG. 7a is an image of a cylindrical vessel made with a low power patch heater placed thereon in connection with an exemplary demonstration of an embodiment of the disclosed subject matter. (COLOR)
Figure 7B:
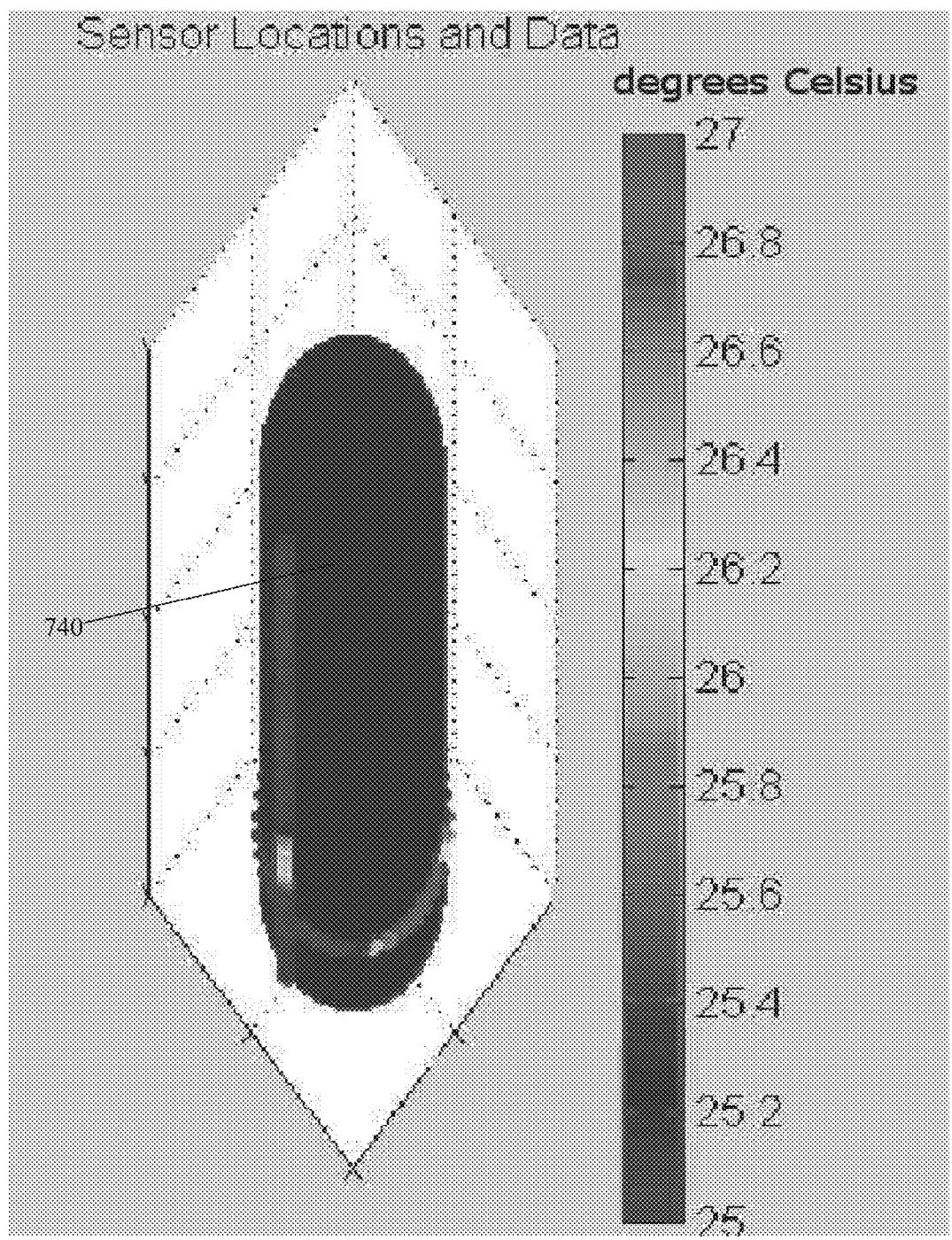
FIG. 7b illustrates a first set of temperature measurements was taken long a first dimension and a second set of temperature measurements was taken along a second dimension in connection with an exemplary demonstration of an embodiment of the disclosed subject matter. (COLOR)
Figure 7C:
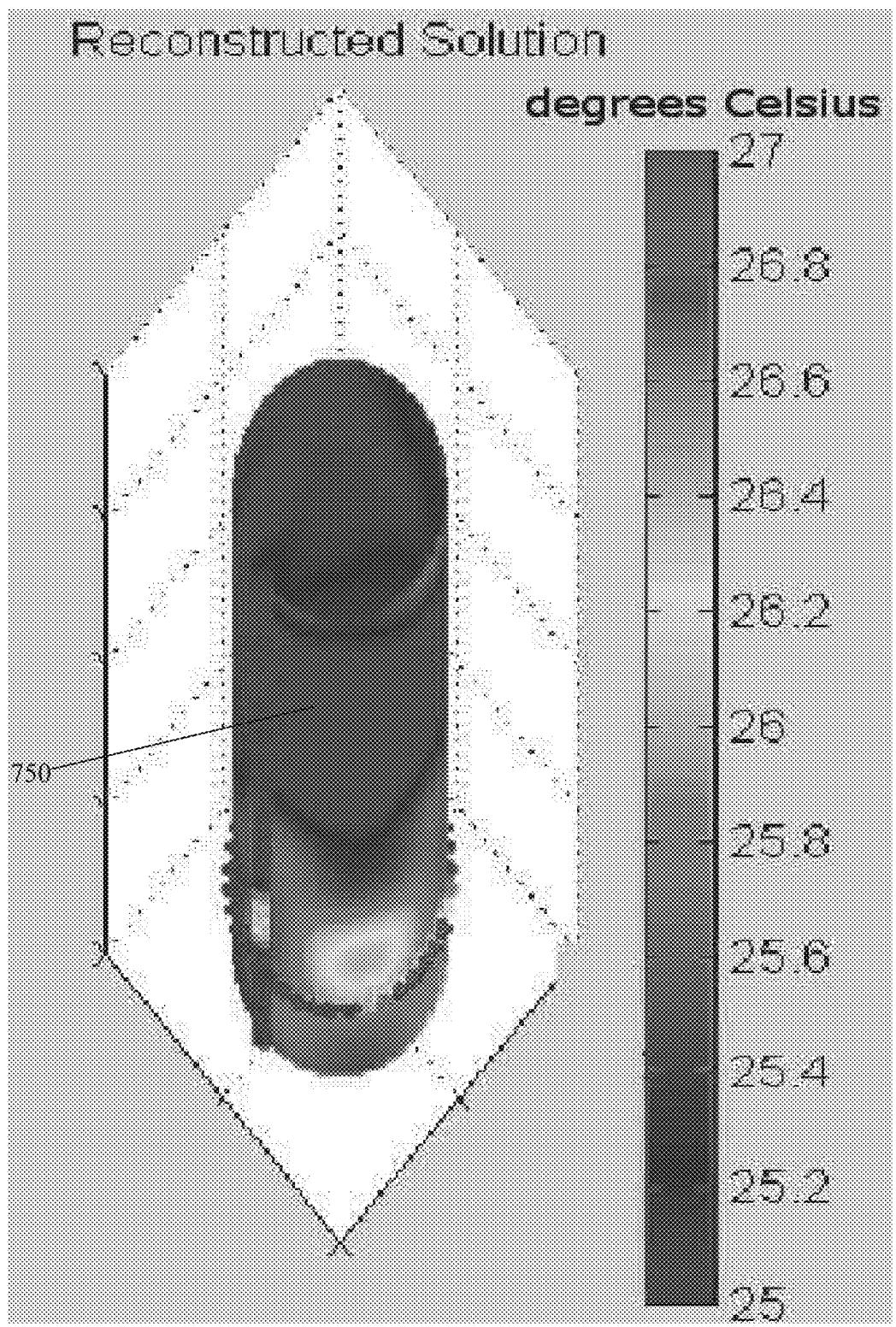
FIG. 7c illustrates a continuous temperature condition profile generated in accordance with an embodiment of the disclosed subject matter. (COLOR)

Further to the synthesized example of FIG. 6a and FIG. 6b, and for purposes of illustration and not limitation, FIG. 7a, FIG. 7b, and FIG. 7c are provided as an exemplary demonstration of the system and method disclosed herein. With reference to FIG. 7a, a local low power patch heater 710 was placed on a cylindrical vessel 701 made of highly conductive steel and having a diameter of approximately 32 cm. A first optical fiber sensor array 720 was arranged along a first dimension (vertically/axially, along the outer wall of the cylindrical vessel 701 at approximately equal spacing of 2 cm). A second optical fiber sensor array 730 was arranged along a second dimension (circumferentially along the outer wall of the cylindrical vessel 701 at equal spacing of 2 cm). In this exemplary demonstration, 53 sensor locations were arranged along the circumference, and 80 sensor locations were arranged along the vertical.

With reference to FIG. 7b, temperature was measured at each sensor location. That is, a first set of temperature measurements was taken long a first dimension (i.e., vertically/axially along the outer wall of the cylindrical vessel 701) and a second set of temperature measurements was taken along a second dimension (i.e., circumferentially along the outer wall of the cylindrical vessel 702). As illustrated by the profile 740 and associated scale, the temperature measurements at the sensor element ranged from 25° C. to 27° C. A continuous surface condition profile 750 was generated by the method and system disclosed herein with only the two arrays of sensors based on the temperature measurements. As illustrated in FIG. 7c, the system and method disclosed herein was able to accurately capture the surface temperature profile of the cylindrical vessel 701 without the need for additional sensors spaced across the entire surface to be measured. Moreover, the system and method disclosed herein was able to accurately capture the surface temperature profile of the cylindrical vessel 701 with high temperature resolution, the total range of temperatures spanning only 2° C.

ADDITIONAL EMBODIMENTS

Additionally or alternately, the invention can include one or more of the following embodiments.

Embodiment 1

A system for detecting a condition within a component of a process plant, comprising: at least one sensor for obtaining a first set of parameter measurements from a first plurality of sensor locations along a first dimension of an outside surface of a component of a process plant and for obtaining at least a second set of parameter measurements from a second plurality of sensor locations along a second dimension of the outside surface of the component; a processor operatively configured to process the first set of parameter measurements and the second set of parameter measurements to develop a continuous surface condition profile of the component using a predetermined model, the model comprising: a forward solution to an equation describing a condition within the component, the forward solution being linearly separable in at least two dimensions, the at least two dimensions corresponding to the first and second dimensions of the outer surface of the component, and an inverse solution to the equation to provide a set of coefficients based on the first and second set of parameter measurements for solving the forward solution; and wherein the processor is configured to output information about the condition within the component based upon the continuous surface condition profile.

Embodiment 2

The system of any one of the previous embodiments, wherein the component includes a cylindrical vessel having a central axis, an inner wall diameter and an outer surface diameter; and wherein the first dimension is parallel to the central axis and disposed at the outer surface diameter, and the second dimension is disposed along a circumference at the outer surface diameter of the cylindrical reactor.

Embodiment 3

The system of any one of the previous embodiments, wherein the first plurality of sensor locations are along the first dimension only; and the second plurality of sensor locations along the second dimension only.

Embodiment 4

The system of any one of the previous embodiments, wherein the at least one sensor measures temperature.

Embodiment 5

The system of any one of the previous embodiments, wherein the condition with the component of a process plant includes a temperature of a wall of the component.

Embodiment 6

The system of any one of the previous embodiments, wherein the predetermined model is based a heat diffusion equation.

Embodiment 7

The system of any one of the previous embodiments, wherein the forward solution is a linear combination of basis functions multiplied by the set of coefficients.

Embodiment 8

The system of any one of the previous embodiments, wherein the set of coefficients is generated based on a predetermined relationship between the first and second set of parameter measurements.

Embodiment 9

The system of any one of the previous embodiments, further comprising a processor operatively configured to predetermine how many coefficients to be included in the set of coefficients corresponding to the set of basis functions.

Embodiment 10

The system of embodiment 9, wherein the processor is operatively configured to determine how many coefficients to be included by: obtaining a first calibration set of parameter measurements from at least one of the first plurality of sensor locations or the second plurality of sensor locations; and applying a transform to the first calibration set to identify a set of coefficients corresponding to spatial frequencies along the first dimension with energy above a predetermined threshold.

Embodiment 11

The system of embodiments 9 or 10, wherein the processor is operatively configured to determine how many coefficients to be included by: obtaining a first calibration set of parameter measurements from the first plurality of sensor locations along the first dimension of the outside surface of the component; applying a discrete cosine transform to the first calibration set to identify a set of coefficients corresponding to spatial frequencies along the first dimension with energy above a predetermined threshold; obtaining at least a second calibration set of parameter measurements from the second plurality of sensor locations along the second dimension of the outside surface of the component; and applying a fast Fourier transform to the second calibration set to identify a set of coefficients corresponding to spatial frequencies along the second dimension with energy above the predetermined threshold.

Embodiment 12

The system of embodiments 9, 10, or 11, wherein the first and second set of sensor locations are arranged based on one or more predetermined coefficients.

Embodiment 13

The system of any one of the previous embodiments, wherein the at least one sensor is further configured to obtain at least a third set of parameter measurements from a third plurality of sensor locations along the outside surface of the component; and wherein the processor is further configured to compare the continuous wall condition profile with the third set of parameter measures at locations of the continuous wall condition profile corresponding to the third plurality of sensor locations, to thereby determine an accuracy of the continuous wall condition profile.

Embodiment 14

The system of any one of the previous embodiments, further comprising a display device to display a representation of the continuous surface condition profile.

Embodiment 15

The system of any one of the previous embodiments, further comprising an alarm to alert when at least a portion of the continuous surface condition profile exceeds a predetermined threshold of the condition.

Embodiment 16

A method for detecting a condition within a component of a process plant, comprising: obtaining a first set of parameter measurements from a first plurality of sensor locations along a first dimension of an outside surface of a component; obtaining at least a second set of parameter measurements from a second plurality of sensor locations along a second dimension of the outside surface of the component; processing the first set of parameter measurements and the second set of parameter measurements, using a computer, to develop a continuous surface condition profile of the component using a predetermined model, the model comprising: a forward solution to an equation describing a condition within the component, the forward solution being linearly separable in at least two dimensions, the at least two dimensions corresponding to the first and second dimensions of the outer surface of the component, and an inverse solution to the equation to provide a set of coefficients, corresponding to a set of basis functions of the forward solution, based on the first and second set of parameter measurements for solving the forward solution; and identifying from the continuous surface condition profile the condition within the component.

Embodiment 17

The method of embodiment 16, wherein the component includes a cylindrical vessel having a central axis, an inner wall diameter and an outer surface diameter; and wherein the first dimension is parallel to the central axis and disposed at the outer surface diameter, and the second dimension is disposed along a circumference at the outer surface diameter of the cylindrical vessel.

Embodiment 18

The method of embodiments 16 or 17, wherein obtaining a first set of parameter measurements consists of obtaining the first set of parameter measurements from the first plurality of sensor locations along the first dimension only; and wherein obtaining at least a second set of parameter measurements consists of obtaining the second set of parameter measurements from the second plurality of sensor locations along the second dimension only.

Embodiment 19

The method of embodiments 16, 17, or 18, wherein the first set of parameter measurements and the second set of parameter measurements comprise temperature measurements.

Embodiment 20

The method of embodiments 16, 17, 18, or 19, wherein the condition with the component of a process plant includes temperature of a wall of the component.

Embodiment 21

The method of embodiments 16, 17, 18, 19, or 20, wherein the predetermined model is based a heat diffusion equation.

Embodiment 22

The method of embodiments 16, 17, 18, 19, 20, or 21, wherein the forward solution is a linear combination of basis functions multiplied by the set of coefficients.

Embodiment 23

The method of embodiments 16, 17, 18, 19, 20, 21, or 22, wherein the set of coefficients is generated based on a predetermined relationship between the first and second set of parameter measurements.

Embodiment 24

The method of embodiments 16, 17, 18, 19, 20, 21, 22, or 23, further comprising predetermining how many coefficients to include in the set of coefficients corresponding to the set of basis functions.

Embodiment 25

The method of embodiment 24, wherein predetermining how many coefficients includes: obtaining a first calibration set of parameter measurements from at least one of the first plurality of sensor locations or the second plurality of sensor locations; and applying a transform to the first calibration set to identify a set of coefficients corresponding to spatial frequencies along the first dimension with energy above a predetermined threshold.

Embodiment 26

The method of embodiments 24 or 25, wherein predetermining how many coefficients includes: obtaining a first calibration set of parameter measurements from the first plurality of sensor locations along the first dimension of the outside surface of the component; applying a discrete cosine transform to the first calibration set to identify a set of coefficients corresponding to spatial frequencies along the first dimension with energy above a predetermined threshold; obtaining at least a second calibration set of parameter measurements from the second plurality of sensor locations along the second dimension of the outside surface of the component; and applying a fast Fourier transform to the second calibration set to identify a set of coefficients corresponding to spatial frequencies along the second dimension with energy above the predetermined threshold.

Embodiment 27

The method of embodiments 24, 25, or 26, further comprising spacing the first and second set of sensor locations based on one or more predetermined coefficients.

Embodiment 28

The method of embodiments 16, 17, 18, 19, 20, 21, 22, 23, 24, 25, 26, or 27, further comprising: obtaining at least a third set of parameter measurements from a third plurality of sensor locations along the outside surface of the component; and comparing the continuous wall condition profile with the third set of parameter measures at locations of the continuous wall condition profile corresponding to the third plurality of sensor locations, to thereby determine an accuracy of the continuous wall condition profile.

Embodiment 29

The method of embodiments 16, 17, 18, 19, 20, 21, 22, 23, 24, 25, 26, 27, or 27, further comprising displaying, on a display device, a representation of the continuous surface condition profile.

Embodiment 30

The method of embodiments 16, 17, 18, 19, 20, 21, 22, 23, 24, 25, 26, 27, 28, or 29, further comprising providing an alert when at least a portion of the continuous surface condition profile exceeds a predetermined threshold of the condition.

Embodiment 31

A method for detecting a condition within a component of a process plant using the system of embodiments 1 through 15, such method comprising: obtaining a first set of parameter measurements from a first plurality of sensor locations along a first dimension of an outside surface of a component; obtaining at least a second set of parameter measurements from a second plurality of sensor locations along a second dimension of the outside surface of the component; processing the first set of parameter measurements and the second set of parameter measurements, using a computer, to develop a continuous surface condition profile of the component using a predetermined model, the model comprising: a forward solution to an equation describing a condition within the component, the forward solution being linearly separable in at least two dimensions, the at least two dimensions corresponding to the first and second dimensions of the outer surface of the component, and an inverse solution to the equation to provide a set of coefficients, corresponding to a set of basis functions of the forward solution, based on the first and second set of parameter measurements for solving the forward solution; and identifying from the continuous surface condition profile the condition within the component.

The presently disclosed subject matter is not to be limited in scope by the specific embodiments herein. Indeed, various modifications of the invention in addition to those described herein will become apparent to those skilled in the art from the foregoing description and the accompanying figures. Such modifications are intended to fall within the scope of the appended claims.

The invention claimed is:

1. A method for detecting a condition within a component of a process plant, comprising:
    providing an array of a plurality of sensors on an outside surface of the component, wherein providing the array of the plurality of sensors comprises:
        locating a first plurality of sensors of the array of the plurality of sensors at a first plurality of sensor locations along a first dimension of the outside surface of the component;
        locating a second plurality of sensors of the array of the plurality of sensors at a second plurality of sensor locations along a second dimension of the outside surface of the component; and
        locating at least one additional sensor of the array of the plurality of sensors on at least one additional sensor location along the outside surface of the component;
    obtaining a first set of parameter measurements from the first plurality of sensors at the first plurality of sensor locations along the first dimension of the outside surface of the component;
    obtaining at least a second set of parameter measurements from the second plurality of sensors at the second plurality of sensor locations along the second dimension of the outside surface of the component;
    processing the first set of parameter measurements and the second set of parameter measurements, using a computer, to develop a continuous surface condition profile of the component using a predetermined model, wherein the array of the plurality of sensors is operatively connected to the computer, the model comprising:
        a forward solution to an equation describing a condition within the component, the forward solution being linearly separable in at least two dimensions, the at least two dimensions corresponding to the first and second dimensions of the outer surface of the component, and
        an inverse solution to the equation to provide a set of coefficients, corresponding to a set of basis functions of the forward solution, based on the first and second set of parameter measurements for solving the forward solution;
    obtaining a third set of parameter measurements from the at least one additional sensor location along the outside surface of the component;
    comparing the continuous surface condition profile with the third set of parameter measurements at locations of the continuous surface condition profile corresponding to the at least one additional sensor location, to thereby determine an accuracy of the continuous surface condition profile;
    identifying from the continuous surface condition profile the condition within the component; and controlling the operation of the component in response to the condition identified from the continuous surface condition profile.

2. The method of claim 1, further comprising displaying, on a display device, a representation of the continuous surface condition profile.

3. The method of claim 1, further comprising:
providing an alert when at least a portion of the continuous surface condition profile exceeds a predetermined threshold of the condition.

4. A method for detecting a condition within a component of a process plant, comprising:
providing an array of a plurality of sensors on an outside surface of the component, wherein providing the array of the plurality of sensors comprises:
locating a first plurality of sensors of the array of the plurality of sensors at a first plurality of sensor locations along a first dimension of the outside surface of the component; and
locating a second plurality of sensors of the array of the plurality of sensors at a second plurality of sensor locations along a second dimension of the outside surface of the component;
obtaining a first set of parameter measurements from the first plurality of sensors at the first plurality of sensor locations along the first dimension of the outside surface of the component;
obtaining at least a second set of parameter measurements from the second plurality of sensors at the second plurality of sensor locations along the second dimension of the outside surface of the component;
processing the first set of parameter measurements and the second set of parameter measurements, using a computer, to develop a continuous surface condition profile of the component using a predetermined model, wherein the array of the plurality of sensors is operatively connected to the computer, wherein processing the first set of parameter measurements and the second set of parameter measurements includes predetermining how many coefficients to include in the set of coefficients corresponding to the set of basis functions, wherein predetermining how many coefficients includes:
obtaining a first calibration set of parameter measurements from at least one of the first plurality of sensor locations or the second plurality of sensor locations; and
applying a transform to the first calibration set to identify a set of coefficients corresponding to spatial frequencies along the first dimension with energy above a predetermined threshold, the model comprising:
a forward solution to an equation describing a condition within the component, the forward solution being linearly separable in at least two dimensions, the at least two dimensions corresponding to the first and second dimensions of the outer surface of the component, and
an inverse solution to the equation to provide a set of coefficients, corresponding to a set of basis functions of the forward solution, based on the first and second set of parameter measurements for solving the forward solution; and
identifying from the continuous surface condition profile the condition within the component.

5. The method of claim 4, wherein the component includes a cylindrical vessel having a central axis, an inner wall diameter and an outer surface diameter; and wherein the first dimension is parallel to the central axis and disposed at the outer surface diameter, and the second dimension is disposed along a circumference at the outer surface diameter of the cylindrical vessel.

6. The method of claim 4, wherein obtaining a first set of parameter measurements consists of obtaining the first set of parameter measurements from the first plurality of sensor locations along the first dimension only; and wherein obtaining at least a second set of parameter measurements consists of obtaining the second set of parameter measurements from the second plurality of sensor locations along the second dimension only.

7. The method of claim 4, wherein the first set of parameter measurements and the second set of parameter measurements comprise temperature measurements.

8. The method of claim 4, wherein the condition with the component of a process plant includes a temperature of a wall of the component.

9. The method of claim 4, wherein the predetermined model is based a heat diffusion equation.

10. The method of claim 4, wherein the forward solution is a linear combination of basis functions multiplied by the set of coefficients.

11. The method of claim 4, wherein the set of coefficients is generated based on a predetermined relationship between the first and second set of parameter measurements.

12. The method of claim 4, wherein applying a transform to the first calibration set to identify a set of coefficients corresponding to spatial frequencies along the first dimension with energy above a predetermined threshold includes applying a discrete cosine transform to the first calibration set to identify a set of coefficients corresponding to spatial frequencies along the first dimension with energy above a predetermined threshold, wherein predetermining how many coefficients further includes:
obtaining at least a second calibration set of parameter measurements from the second plurality of sensor locations along the second dimension of the outside surface of the component; and
applying a fast Fourier transform to the second calibration set to identify a set of coefficients corresponding to spatial frequencies along the second dimension with energy above the predetermined threshold.

13. The method of claim 4, further comprising spacing the first and second set of sensor locations based on one or more predetermined coefficients.

14. A system for detecting a condition within a component of a process plant, comprising:
an array of a plurality of sensors on an outside surface of the component, wherein the array of the plurality of sensors comprises a first plurality of sensors for obtaining a first set of parameter measurements from a first plurality of sensor locations along a first dimension of the outside surface of the component of the process plant and a second plurality of sensors for obtaining at least a second set of parameter measurements from a second plurality of sensor locations along a second dimension of the outside surface of the component;
a processor operatively connected to the array of the plurality of sensors and configured to process the first set of parameter measurements and the second set of parameter measurements to develop a continuous surface condition profile of the component using a predetermined model, the model comprising:
a forward solution to an equation describing a condition within the component, the forward solution being linearly separable in at least two dimensions, the at least two dimensions corresponding to the first and second dimensions of the outer surface of the component, and an inverse solution to the equation to provide a set of coefficients based on the first and second set of parameter measurements for solving the forward solution;

wherein the processor is operatively configured to predetermine how many coefficients to be included in the set of coefficients corresponding to the set of basis functions, wherein the processor is operatively configured to determine how many coefficients to be included by:

obtaining a first calibration set of parameter measurements from at least one of the first plurality of sensor locations or the second plurality of sensor locations, wherein applying a transform to the first calibration set includes applying a discrete cosine transform to the first calibration set to identify a set of coefficients corresponding to spatial frequencies along the first dimension with energy above a predetermined threshold; and applying a transform to the first calibration set to identify a set of coefficients corresponding to spatial frequencies along the first dimension with energy above a predetermined threshold, wherein obtaining a first calibration set of parameter measurements includes obtaining a first calibration set of parameter measurements from the first plurality of sensor locations along the first dimension of the outside surface of the component;

wherein the processor is configured to output information about the condition within the component based upon the continuous surface condition profile; and wherein the processor is operatively configured to determine how many coefficients to be included by further:

obtaining at least a second calibration set of parameter measurements from the second plurality of sensor locations along the second dimension of the outside surface of the component; and applying a fast Fourier transform to the second calibration set to identify a set of coefficients corresponding to spatial frequencies along the second dimension with energy above the predetermined threshold.

15. The system of claim 14, wherein the component includes a cylindrical vessel having a central axis, an inner wall diameter and an outer surface diameter; and wherein the first dimension is parallel to the central axis and disposed at the outer surface diameter, and the second dimension is disposed along a circumference at the outer surface diameter of the cylindrical reactor.

16. The system of claim 14, wherein the first plurality of sensor locations are along the first dimension only; and the second plurality of sensor locations are along the second dimension only.

17. The system of claim 14, wherein the plurality of sensors measures temperature.

18. The system of claim 14, wherein the condition with the component of a process plant includes temperature of a wall of the component.

19. The system of claim 14, wherein the predetermined model is based a heat diffusion equation.

20. The system of claim 14, wherein the forward solution is a linear combination of basis functions multiplied by the set of coefficients.

21. The system of claim 14, wherein the set of coefficients is generated based on a predetermined relationship between the first and second set of parameter measurements.

22. The system of claim 14, wherein the first and second set of sensor locations are arranged based on one or more predetermined coefficients.

23. The system of claim 14, wherein at least one additional sensor of the array of the plurality of sensors is located on at least one additional sensor location along the outside surface of the component and is further configured to obtain a third set of parameter measurements from at least one additional sensor location along the outside surface of the component; and wherein the processor is further configured to compare the continuous surface condition profile with the third set of parameter measurements at locations of the continuous surface condition profile corresponding to the at least one additional sensor location, to thereby determine an accuracy of the continuous surface condition profile.

24. The system of claim 14, further comprising a display device to display a representation of the continuous surface condition profile.

25. The system of claim 14, wherein the processor is capable of identifying from the continuous surface condition profile the condition within the component.

* * * * *